(12) United States Patent
Parkvall et al.

(10) Patent No.: US 11,711,173 B2
(45) Date of Patent: *Jul. 25, 2023

(54) PERSISTENT INDICATION OF ACKNOWLEDGEMENT RESOURCES

(71) Applicant: Telefonaktiebolaget LM Ericsson (publ), Stockholm (SE)

(72) Inventors: Stefan Parkvall, Bromma (SE); Robert Baldemair, Solna (SE); Erik Dahlman, Stockholm (SE); Sorour Falahati, Stockholm (SE); Daniel Larsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,337

(22) Filed: Jun. 23, 2022

(65) Prior Publication Data

US 2022/0329365 A1 Oct. 13, 2022

Related U.S. Application Data

(63) Continuation of application No. 17/524,197, filed on Nov. 11, 2021, now Pat. No. 11,394,499, which is a (Continued)

(51) Int. Cl.
*H04L 1/1829* (2023.01)
*H04W 72/21* (2023.01)
(Continued)

(52) U.S. Cl.
CPC .......... *H04L 1/1861* (2013.01); *H04L 1/1819* (2013.01); *H04L 1/1854* (2013.01); *H04L 5/0055* (2013.01); *H04W 72/21* (2023.01)

(58) Field of Classification Search
CPC ... H04L 1/1819; H04L 1/1854; H04L 1/1861; H04W 72/0413
See application file for complete search history.

(56) References Cited

U.S. PATENT DOCUMENTS 7,054,316 B2 5/2006 Cheng et al.
7,643,419 B2 1/2010 Terry et al.
(Continued)

FOREIGN PATENT DOCUMENTS

CN 104053170 A 9/2014
EP 1569403 A2 8/2005
(Continued)

OTHER PUBLICATIONS

Japanese Office Action with English Summary for Japanese Patent Application No. 2019-559786, dated Feb. 19, 2021, 4 pages.
(Continued)

*Primary Examiner* — Jamal Javaid
*Assistant Examiner* — Ryan C Kavleski
(74) *Attorney, Agent, or Firm* — Sage Patent Group

(57) ABSTRACT

A user equipment is configured with at least two collections of uplink resources to be used for transmitting control information to a communication network. The UE receives an assignment of radio resources to be used for receiving a downlink transmission from a base station of the communication network. The UE receives an acknowledgement resource indication, ARI, indicating one of the configured collections of uplink resources to be used for transmitting control information associated with the DL transmission. Further, the UE transmits the control information to the base station on at least a subset of the indicated collection of UL resources. In example embodiments, the indicated collection of uplink resources comprises a plurality of selectable uplink resource sets. The control information is transmitted on one
(Continued)

of the uplink resource sets which corresponds to an operational state of the communication network.

14 Claims, 5 Drawing Sheets

Related U.S. Application Data continuation of application No. 16/068,250, filed as application No. PCT/SE2018/050392 on Apr. 18, 2018, now Pat. No. 11,265,115.

(60) Provisional application No. 62/501,754, filed on May 5, 2017.

(51) Int. Cl.
*H04L 1/1812* (2023.01)
*H04L 5/00* (2006.01)

(56) References Cited

U.S. PATENT DOCUMENTS

| | | |
|---|---|---|
| 2009/0109906 A1 | 4/2009 | Love et al. |
| 2012/0263121 A1 | 10/2012 | Anshi et al. |
| 2013/0343238 A1 | 12/2013 | Seo et al. |
| 2014/0098780 A1 | 4/2014 | Kim et al. |
| 2014/0226543 A1 | 8/2014 | Li |
| 2015/0043433 A1 | 2/2015 | Ren |
| 2015/0163793 A1 | 6/2015 | Han |
| 2016/0014745 A1 | 1/2016 | Papasakellariou et al. |
| 2016/0094327 A1 | 3/2016 | Han |
| 2016/0359591 A1 | 12/2016 | Yellapantula et al. |
| 2018/0132264 A1 | 5/2018 | Jung |
| 2020/0314679 A1 | 10/2020 | Heo et al. |

FOREIGN PATENT DOCUMENTS

| | | |
|---|---|---|
| EP | 1545040 B1 | 4/2009 |
| JP | 2015534394 A | 11/2015 |
| RU | 2433570 C1 | 11/2012 |
| RU | 2541117 C2 | 2/2015 |
| WO | WO 2012/169753 A2 | 12/2012 |

OTHER PUBLICATIONS

Russian Search Report for Russian Application No. 2019138464 dated Jun. 25, 2020, 4 pages.
Russian Office Action for Russian Application No. 2019138464 dated Jun. 25, 2020, 9 pages.
"Physical Uplink Control Channel Procedures," 3GPP TS 36.213 V14.2.0 (Mar. 2017) Release 14, pp. 303-384.
$3^{rd}$ Generation Partnership Project; Technical Specification Group Radio Access Network; Study on New Radio Access Technology, Physical Layer Aspects (Release 14), 3GPP TR 38.802 V14.0.0 (Mar. 2017) 143 pages.
Chinese First Office Action for Chinese Patent Application No. 201880029939.7, dated Aug. 26, 2021, 13 paqes.
Communication under Rule 71 (3) EPC for European Patent Application No. 18720404.5 dated Sep. 16, 2020, 10 pages.
Huawei et al., Dynamic adaptation of PUCCH formats for HARQ-ACK feedback, 3GPP TSG RAN WGI Meeting #82bis Malmo, Sweden, Oct. 5-9, 2015, R1-155093, 6 pages.
Notice of Preliminary Rejection with English Summary for Korean Patent Application No. 2019-7034075, dated Oct. 14, 2020, 11 pages.
International Search Report and Written Opinion of the International Searching Authority, PCT/SE2018/050392, dated Jul. 10, 2018, 18 pages.

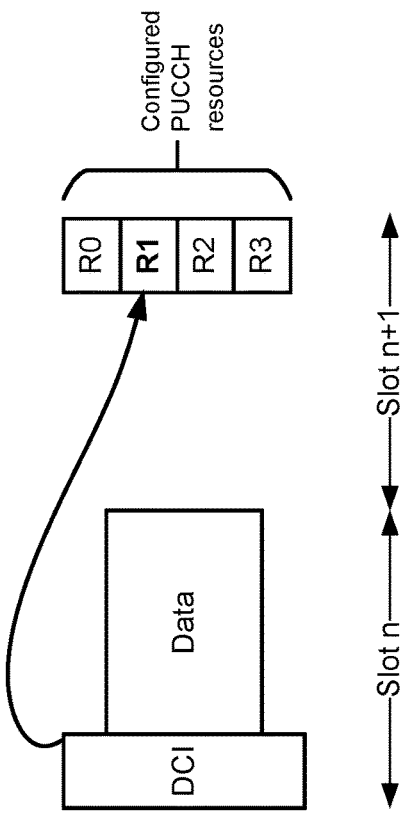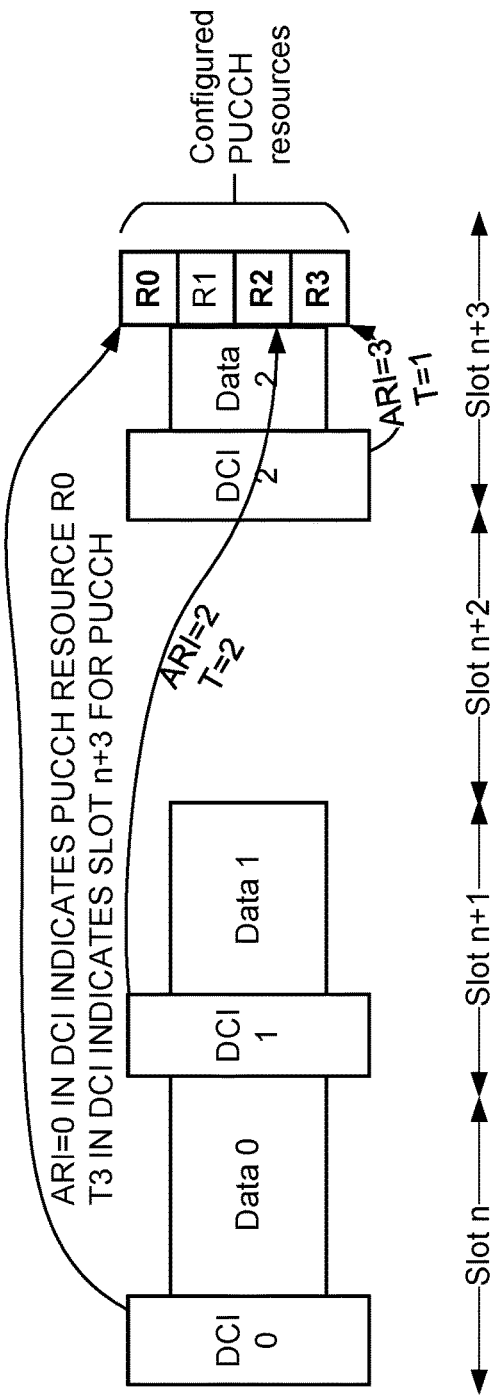
FIG. 1A
FIG. 1B

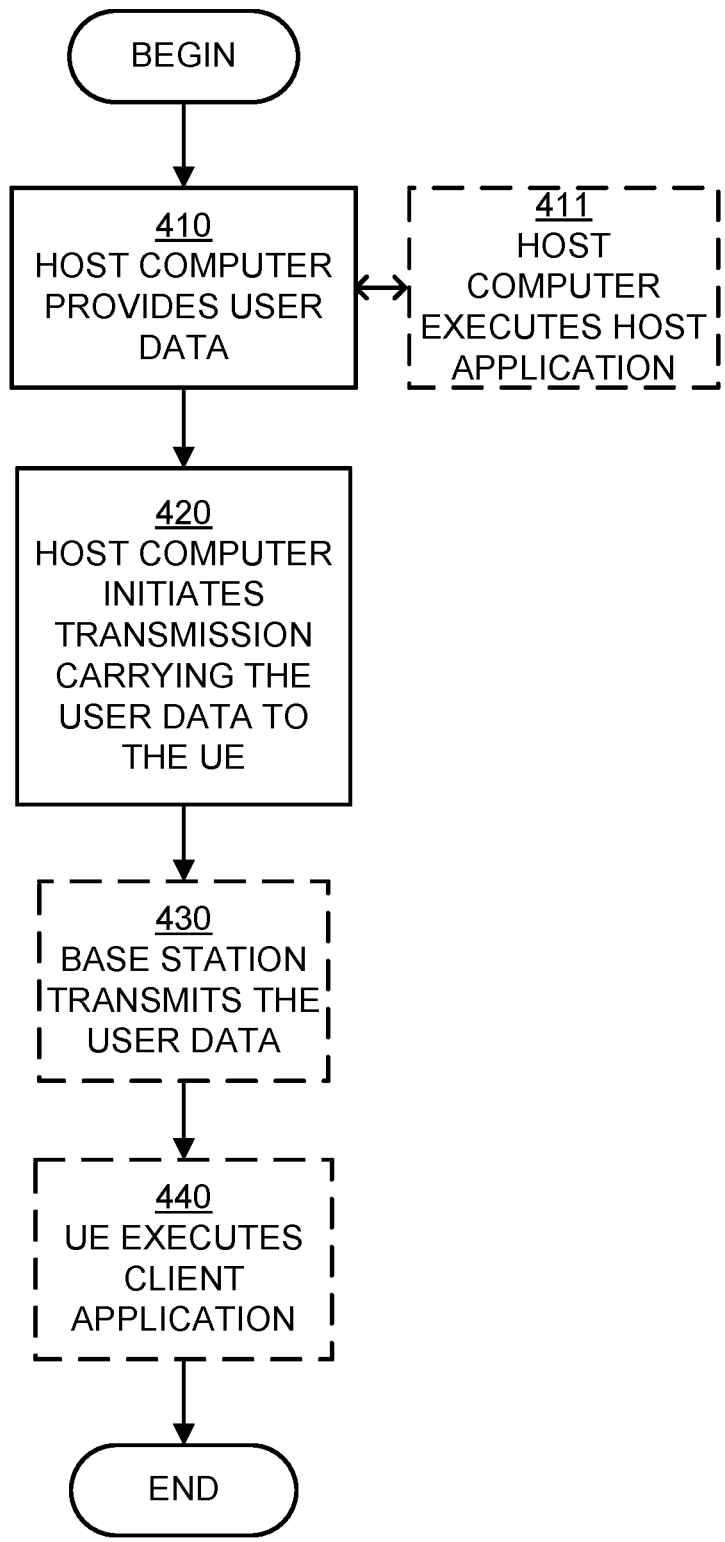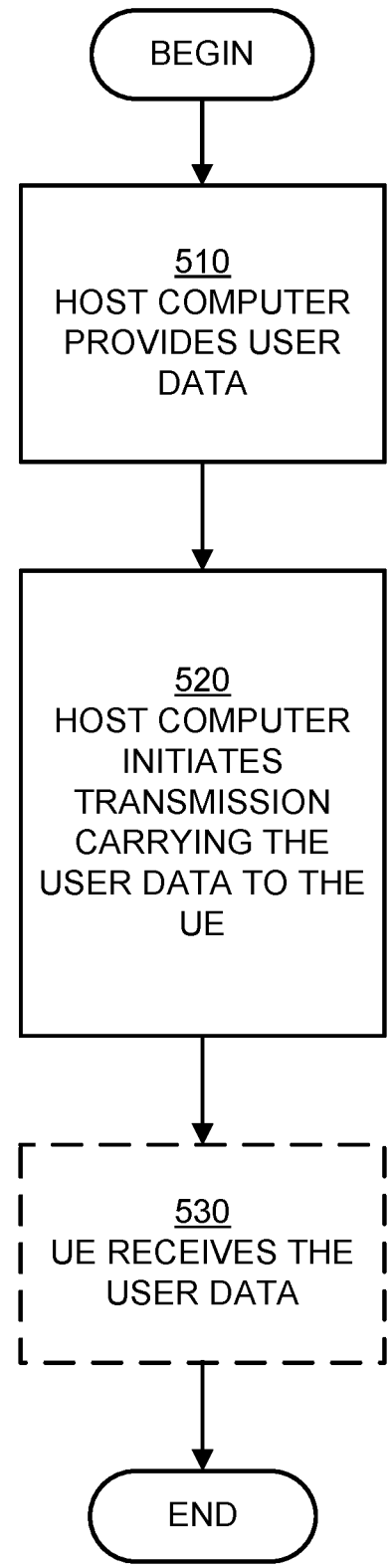
FIG. 4
FIG. 5

PERSISTENT INDICATION OF ACKNOWLEDGEMENT RESOURCES

CROSS-REFERENCE TO RELATED APPLICATIONS

This application is a continuation of U.S. patent application Ser. No. 17/524,197, filed on Nov. 11, 2021, which is a continuation of U.S. patent application Ser. No. 16/068,250, filed on Jul. 5, 2018, issued as U.S. Pat. No. 11,265,115 on Mar. 1, 2022, which is a 35 U.S.C. § 371 national stage application of PCT International Application No. PCT/SE2018/050392 filed on Apr. 18, 2018, which in turns claims domestic priority to U.S. Provisional Patent Application No. 62/501,754, filed on May 5, 2017, the disclosures and contents of which are incorporated by reference herein in their entireties

TECHNICAL FIELD

Disclosed herein are techniques for transmitting and receiving control information associated with a wireless link. In particular, there is proposed a mechanism for indicating radio resources for acknowledgement feedback that may allow the communication parties to adapt the representation of the acknowledgement feedback.

BACKGROUND

Wireless networks standardized by Third Generation Partnership Long Term Evolution (3GPP LTE) implement ARQ (Automatic Repeat Request) or hybrid-ARQ (HARQ), wherein HARQ also includes forward error correction. In networks of this type, transmitting devices are required to send acknowledgement feedback to the receiving device indicative of a result of decoding a transport block or codeword (ACK/NACK or ACK/NAK feedback). The ACK/NACK related to downlink (DL) transmissions is transmitted on the uplink (UL). The feedback is used to trigger fast retransmissions. The signaling aspects of HARQ in LTE are specified inter alia in clause 10 of 3GPP Technical Specification 36.213.

The physical uplink control channel (PUCCH) in 3GPP New Radio (NR), including the acknowledgement feedback mechanism, is currently being developed.

It has been agreed that NR will support explicit resource allocation. It has been agreed that the Downlink Control Information (DCI) message can indicate the slot in which to report HARQ feedback. In addition to the timing the UE also needs to know the exact PUCCH resource. It has been agreed to at least support PUCCH resources configured by higher layers, and DCI indicates which of the configured resources to use. FIG. 1A is a simplified time-frequency diagram, in which a DL transmission is shown scheduled in slot n and an Acknowledgement Resource Indication (ARI) included in the DCI message requests the HARQ feedback in resource R1. DCI furthermore contains an indication, denoted "T=1", which requests the HARQ feedback to be transmitted in slot n+1. It is recalled that an NR slot corresponds to 7 or 14 Orthogonal Frequency-Division Multiplexing (OFDM) symbols; at 15-kHz subcarrier spacing, a slot with 7 OFDM symbols occupies 0.5 ms. Concerning NR terminology, reference is made to 3GPP TR 38.802 v14.0.0 or later versions.

In FIG. 1B, another scheduling example is shown where a UE is scheduled in subsequent slots where DL transmissions are scheduled. Due to lack of PUCCH opportunities, e.g. no UL opportunities, HARQ feedback for all three shown transmissions is requested in slot n+3. More precisely, the ACK/NACK timing indicator included in the DCI messages points for all transmissions to slot n+3. The instances of ARI included in the DCIs point at different PUCCH resources to avoid collisions.

It is currently expected that NR will support at least the following PUCCH formats:

Short PUCCH Format 1: 1 symbol, payload 1-2 bits
Short PUCCH Format 2: 1 symbol, >2 bits
Short PUCCH Format 3: 2 symbol, 1-2 bits
Short PUCCH Format 4: 2 symbol, >2 bits
Long PUCCH Format 1: 4-14 symbols, 1-2 bits
Long PUCCH Format 2: 4-14 symbols, >2 to 10 or few 10 bits
Long PUCCH Format 3: 4-14 symbols, >10 for few 10 bits Since the formats occupy different amounts of UL resources, the ARI in NR may be required to indicate a wide range of values. Rather than accepting the comparatively large signaling overhead that this would represent if implemented by a straightforward approach, the techniques proposed herein seek to simplify the ARI and limit its contribution to the total overhead.

SUMMARY

The invention proposes devices, methods, computer programs and computer program products addressing the needs and problems outlined in the preceding section.

In a first aspect, there is provided a method of transmitting control information to a communication network, the method being implemented in a user equipment and comprising:

being configured with at least two collections of UL resources to be used for transmitting control information to the communication network;

receiving an assignment of radio resources to be used for receiving a DL transmission from a base station of the communication network;

receiving an ARI indicating one of the configured collections of UL resources to be used for transmitting control information associated with the DL transmission; and transmitting the control information to the base station on at least a subset of the indicated collection of UL resources, wherein the indicated collection of UL resources comprises a plurality of selectable UL resource sets and the control information is transmitted on one of the UL resource sets which corresponds to an operational state of the communication network. The base station may be included in a communication system which further includes a host computer configured to transmit user data to the user equipment via the base station.

In a second aspect, there is provided a UE comprising a radio interface and processing circuitry configured to:

allow the UE to be configured with at least two collections of UL resources to be used for transmitting control information to the communication network;

receive an assignment of radio resources to be used for receiving a DL transmission from a base station of the communication network;

receive an ARI indicating one of the configured collections of UL resources to be used for transmitting control information associated with the DL transmission; and transmit the control information to the base station on at least a subset of the indicated collection of UL resources, wherein the indicated collection of UL resources comprises a plurality of selectable UL resource sets and the control information is transmitted on one of the UL resource sets which corresponds to an operational state of the communication network. The base station may be included in a communication system which further includes a host computer configured to transmit user data to the user equipment via the base station.

In a third aspect, there is provided a method of receiving control information at a base station of a communication network, the method comprising:

obtaining a configuration of at least two collections of UL resources to be used for receiving control information from user equipments in coverage of the communication network;

assigning radio resources to be used for transmitting a DL transmission to a user equipment;

transmitting an ARI to the user equipment, the ARI indicating one of the configured collections of UL resources to be used for receiving control information associated with the DL transmission; and receiving the control information from the user equipment on at least a subset of the indicated collection of UL resources, wherein the indicated collection of UL resources comprises a plurality of selectable UL resource sets and the control information is received on one of the UL resource sets which corresponds to an operational state of the communication network. The base station may be included in a communication system which further includes a host computer configured to transmit user data to the user equipment via the base station.

In a fourth aspect, there is provided a base station for operating in a communication network comprising a radio interface and processing circuitry configured to:

obtain a configuration of at least two collections of UL resources to be used for receiving control information from user equipments in coverage of the communication network;

assign radio resources to be used for transmitting a DL transmission to a user equipment;

transmit an ARI to the user equipment, the ARI indicating one of the configured collections of UL resources to be used for receiving control information associated with the DL transmission; and receive the control information from the user equipment on at least a subset of the indicated collection of UL resources, wherein the indicated collection of UL resources comprises a plurality of selectable UL resource sets and the control information is received on one of the UL resource sets which corresponds to an operational state of the communication network. The base station may be included in a communication system which further includes a host computer configured to transmit user data to the user equipment via the base station.

The dependent claims define example embodiments. It is noted that the invention relates to all combinations of features even if received in mutually different claims.

BRIEF DESCRIPTION OF THE DRAWINGS

Example embodiments will now be described with reference to the accompanying drawings, on which:

FIGS. 1A and 1B discussed above are time-frequency diagrams illustrating DL control channel resources, DL data resources and UL control channel resources;

FIGS. 4 and 5 are flowcharts illustrating methods implemented in a communication system including a host computer, a base station and a user equipment;

DETAILED DESCRIPTION OF EXAMPLE EMBODIMENTS

Within the context of the present disclosure, the term "communication network" or short "network" may particularly denote a collection of nodes or entities, related transport links, and associated management needed for running a service, for example a telephony service or a packet transport service. Depending on the service, different node types or entities may be used to realize the service. The communication network is owned by a network operator or operated on the network operator's behalf and offers the implemented services to its subscribers. Typical examples of a communication network are radio access network, such as WLAN/Wi-Fi™ and cellular networks like 2G/GSM, 3G/UMTS, 4G/LTE and NR.

Within the context of the present disclosure, each of the terms "user equipment" (UE) and "wireless communication device" refers to a device for instance used by a person for his or her personal communication. It can be a telephone-type of device, for example a telephone or a SIP phone, cellular telephone, a mobile station, cordless phone, or a personal digital assistant type of device like laptop, notebook, notepad equipped with a wireless data connection, or table computer. The UE may also be associated with non-humans like animals, plants, or even machines, and may then be configured for machine-type communication, machine-to-machine communication, device-to-device communication or sidelink. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present disclosure, each of the terms "base station" and "wireless access node" refers to a node of a radio access network that is used as interface between land-based transport links and radio-based transport links, wherein the radio-based transport link interfaces directly with a UE. In different generations of cellular communication, the term base station may refer to a BTS, a NodeB, an eNodeB or gNB. In WLAN/Wi-Fi™ architecture, a base station refers to an Access Point (AP).

The invention may be put to use in any node in a network that implements transmitter or receiver functionality. One typical implementation is in a UE and relates to processing of a downlink transport block with ACK/NACK feedback transmitted on uplink.

Figure 2:
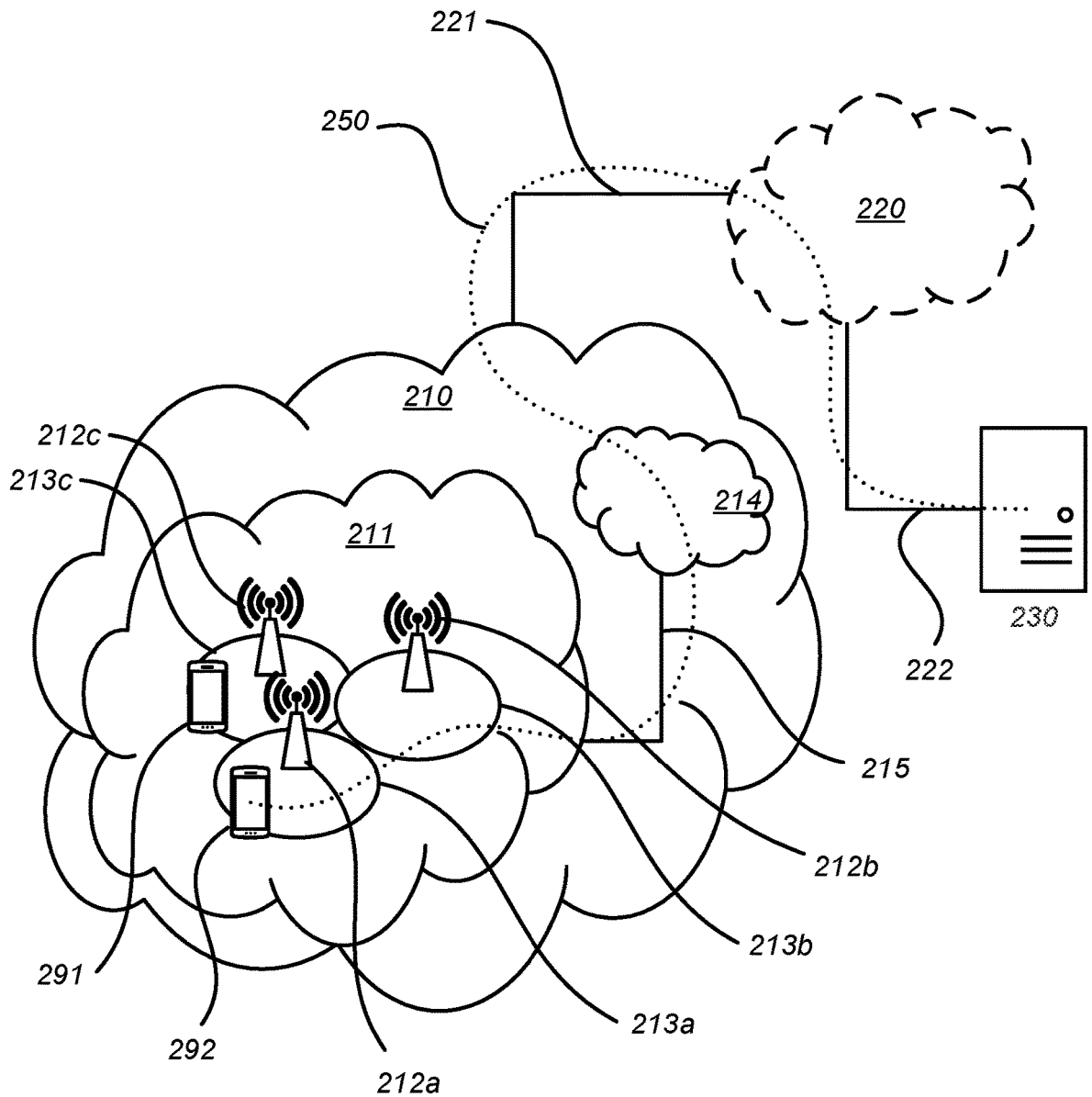
FIG. 2 schematically illustrates a telecommunication network which is optionally connected, via an intermediate network, to a host computer.

With reference to FIG. 2, in accordance with an embodiment, a communication system includes a telecommunication network 210, such as a 3GPP-type cellular network, which comprises an access network 211, such as a radio access network, and a core network 214. The access network 211 comprises a plurality of base stations 212a, 212b, 212c, such as NBs, eNBs, gNBs or other types of wireless access points, each defining a corresponding coverage area 213a, 213b, 213c. Each base station 212a, 212b, 212c is connectable to the core network 214 over a wired or wireless connection 215. A first user equipment (UE) 291 located in coverage area 213c is configured to wirelessly connect to, or be paged by, the corresponding base station 212c. A second UE 292 in coverage area 213a is wirelessly connectable to the corresponding base station 212a. While a plurality of UEs 291, 292 are illustrated in this example, the disclosed embodiments are equally applicable to a situation where a sole UE is in the coverage area or where a sole UE is connecting to the corresponding base station.

Optionally, the telecommunication network 210 is itself connected to a host computer 230, which may be embodied in the hardware and/or software of a standalone server, a cloud-implemented server, a distributed server or as processing resources in a server farm. The host computer 230 may be under the ownership or control of a service provider, or may be operated by the service provider or on behalf of the service provider. The connections 221, 222 between the telecommunication network 210 and the host computer 230 may extend directly from the core network 214 to the host computer 230 or may go via an optional intermediate network 220. The intermediate network 220 may be one of, or a combination of more than one of, a public, private or hosted network; the intermediate network 220, if any, may be a backbone network or the Internet; in particular, the intermediate network 220 may comprise two or more sub-networks (not shown).

The communication system of FIG. 2 as a whole enables connectivity between one of the connected UEs 291, 292 and the host computer 230. The connectivity may be described as an over-the-top (OTT) connection 250. The host computer 230 and the connected UEs 291, 292 are configured to communicate data and/or signaling via the OTT connection 250, using the access network 211, the core network 214, any intermediate network 220 and possible further infrastructure (not shown) as intermediaries. The OTT connection 250 may be transparent in the sense that the participating communication devices through which the OTT connection 250 passes are unaware of routing of upstream and downstream communications. For example, a base station 212 may not or need not be informed about the past routing of an incoming downstream communication with data originating from a host computer 230 to be forwarded (e.g., handed over) to a connected UE 291. Similarly, the base station 212 need not be aware of the future routing of an outgoing upstream communication originating from the UE 291 towards the host computer 230.

Example implementations, in accordance with an embodiment, of the UE, base station and host computer discussed in the preceding paragraphs will now be described with reference to FIG. 3. In a communication system 300, a host computer 310 comprises hardware 315 including a communication interface 316 configured to set up and maintain a wired or wireless connection with an interface of a different communication device of the communication system 300. The host computer 310 further comprises processing circuitry 318, which may have storage and/or processing capabilities. In particular, the processing circuitry 318 may comprise one or more programmable processors, application-specific integrated circuits, field programmable gate arrays or combinations of these (not shown) adapted to execute instructions. The host computer 310 further comprises software 311, which is stored in or accessible by the host computer 310 and executable by the processing circuitry 318. The software 311 includes a host application 312. The host application 312 may be operable to provide a service to a remote user, such as a UE 330 connecting via an OTT connection 350 terminating at the UE 330 and the host computer 310. In providing the service to the remote user, the host application 312 may provide user data which is transmitted using the OTT connection 350.

The communication system 300 further includes a base station 320 provided in a telecommunication system and comprising hardware 325 enabling it to communicate with the host computer 310 and with the UE 330. The hardware 325 may include a communication interface 326 for setting up and maintaining a wired or wireless connection with an interface of a different communication device of the communication system 300, as well as a radio interface 327 for setting up and maintaining at least a wireless connection 370 with a UE 330 located in a coverage area (not shown in FIG. 3) served by the base station 320. The communication interface 326 may be configured to facilitate a connection 360 to the host computer 310. The connection 360 may be direct or it may pass through a core network (not shown in FIG. 3) of the telecommunication system and/or through one or more intermediate networks outside the telecommunication system. In the embodiment shown, the hardware 325 of the base station 320 further includes processing circuitry 328, which may comprise one or more programmable processors, application-specific integrated circuits, field programmable gate arrays or combinations of these (not shown) adapted to execute instructions. The base station 320 further has software 321 stored internally or accessible via an external connection.

The communication system 300 further includes the UE 330 already referred to. Its hardware 335 may include a radio interface 337 configured to set up and maintain a wireless connection 370 with a base station serving a coverage area in which the UE 330 is currently located. The hardware 335 of the UE 330 further includes processing circuitry 338, which may comprise one or more programmable processors, application-specific integrated circuits, field programmable gate arrays or combinations of these (not shown) adapted to execute instructions. The UE 330 further comprises software 331, which is stored in or accessible by the UE 330 and executable by the processing circuitry 338. The software 331 may optionally include a client application 332. The client application 332 may be operable to provide a service to a human or non-human user via the UE 330, with the support of the host computer 310. In the host computer 310, an executing host application 312 may communicate with the executing client application 332 via the OTT connection 350 terminating at the UE 330 and the host computer 310. In providing the service to the user, the client application 332 may receive request data from the host application 312 and provide user data in response to the request data. The OTT connection 350 may transfer both the request data and the user data. The client application 332 may interact with the user to generate the user data that it provides.

Figure 3:
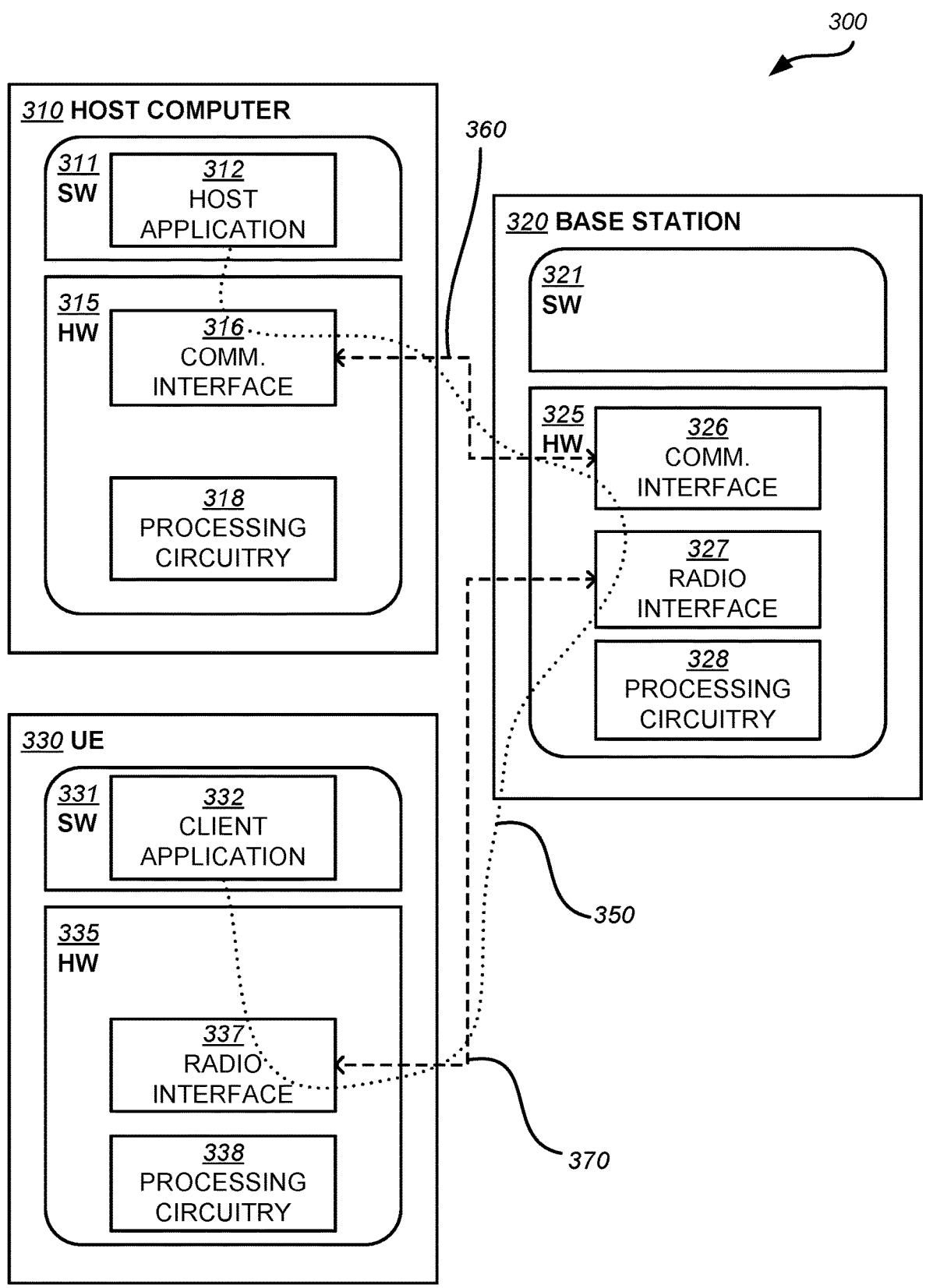
FIG. 3 is a generalized block diagram of a host computer communicating via a base station with a user equipment over a partially wireless connection.

It is noted that the host computer 310, base station 320 and UE 330 illustrated in FIG. 3 may be identical to the host computer 230, one of the base stations 212a, 212b, 212c and one of the UEs 291, 292 of FIG. 2, respectively. This is to say, the inner workings of these entities may be as shown in FIG. 3 and independently, the surrounding network topology may be that of FIG. 2.

In FIG. 3, the OTT connection 350 has been drawn abstractly to illustrate the communication between the host computer 310 and the use equipment 330 via the base station 320, without explicit reference to any intermediary devices and the precise routing of messages via these devices. Network infrastructure may determine the routing, which it may be configured to hide from the UE 330 or from the service provider operating the host computer 310, or both. While the OTT connection 350 is active, the network infrastructure may further take decisions by which it dynamically changes the routing (e.g., on the basis of load balancing consideration or reconfiguration of the network).

As already outlined, a base station 320 dynamically schedules downlink transmissions to UEs 330. The scheduling may be based on channel state and quality information reports received from the UEs 330 on the PUCCH or a physical shared uplink channel or may be based on other factors. The channel state and quality information reports indicate the instantaneous channel conditions as seen by the receiver. In each time interval (e.g., a LTE subframe or NR slot), the base station 320 transmits DCI identifying the UEs that have been scheduled to receive data in the current time interval and the resources on which the data is being transmitted to the scheduled UEs. The DCI is typically transmitted on a physical downlink control channel in an early portion of the time interval.

ARQ or HARQ is used to mitigate errors that occur during transmission of data on the DL. When the base station 320 indicates that a UE 330 is scheduled to receive a DL transmission, the UE 330 attempts to decode the transmission and transmits an acknowledgement message to the base station on the physical uplink control or shared channel. The acknowledgement message informs the base station whether the data packet was correctly received by the UE 330. The acknowledgement message may be either a positively valued acknowledgement (ACK) indicating a successful decoding or a negatively valued acknowledgement (NACK) message indicating a decoding failure. Based on the acknowledgement message received from the UE 330, the base station 320 determines whether to transmit new data (ACK received) or to retransmit the previous data (NACK received). The introduction of an Acknowledgement Resource Indicator (ARI) in connection with LTE carrier aggregation allowed explicit allocation of resources for the acknowledgement message, so that several UEs were able to share a pool of UL resources semi-statically reserved for this purpose without collisions. The resource sharing was efficient since the average number of UEs simultaneously assigned resources on several DL carriers was small.

To initiate UL transmissions, a UE 330 may transmit a scheduling request (SR) to a base station 320 on the PUCCH when it has data to send but no valid uplink grant. The base station 320 allocates uplink resources responsive to the scheduling requests and transmits a scheduling grant to the UE 330 on a physical DL control channel. When the data is received or no data arrives in the allocated uplink resources, the base station 320 may transmit ACK/NACK signaling to the UE 330 on a DL channel to indicate whether the data is received correctly. As an alternative to ACK/NACK signaling, the base station 320 may schedule the UE 330 to resend the same UL data.

Returning to DL transmissions, NR may, as noted, support a large number of PUCCH formats with different UL resource requirements. In this context, although a resource may be referenced by a single resource index, it may be defined by a combination or one or more of time, frequency, phase rotation, orthogonal cover code (OCC). Additionally or alternatively, cyclic shift, starting symbol, duration (in number of symbols) and/or bandwidth (in number of physical resource blocks) may be configured for a resource. A choice of one of the indicated UL resources by the UE 330 may represent an acknowledgement feedback value, such as positive or negative acknowledgement. Optionally, the acknowledgement feedback value may be combined with a restriction to a specific portion of the DL transmission (this may allow differently valued acknowledgements to be sent for different portions of the DL transmission) and/or further information, such as a scheduling request, and different degrees of bundling and multiplexing may be applied. As a result of these or similar factors, which are absent in such earlier communication systems where the acknowledgement feedback is of constant length, the number of distinct allocable UL resources may vary between different operating conditions, leading to a considerable gap between the minimum and maximum number of required ART values. Therefore, embodiments herein may need to distinguish between different operating conditions or between groups of operating conditions for which the acknowledgment feedback length is constant within each group.

A straightforward way to accommodate the full range of ARI values would be to allow ARI more resources within DCI. This however would add a constant signaling overhead corresponding to the worst case—the most comprehensive set of acknowledgement feedback values—also in situations where this is not needed, Instead, example embodiments herein propose a persistent ARI which is interpreted in view of a current operational state of the communication network.

Figure 6:
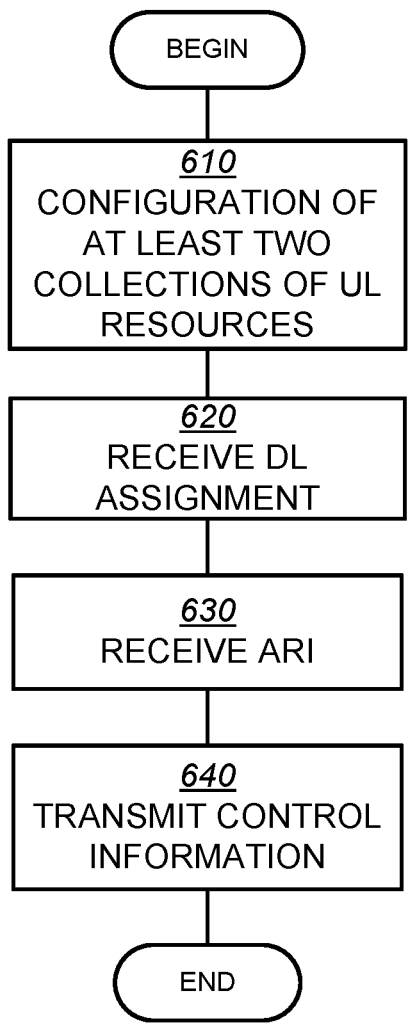
FIG. 6 is a flowchart illustrating a method implemented in a user equipment.

More precisely and in accordance with an example embodiment, FIG. 6 illustrates a method implemented in the UE 330.

In a first step 610, the UE 330 is configured with at least two collections of UL resources to be used for transmitting, control information to the communication network 300. On a network level, the configuration may have the effect that the collections of UL resources are reserved for transmitting control information. The collections of UL, resources may be understood as a pool of resources that may be shared, in accordance with the ART, between the UEs currently operating in the system.

In a second step 620, the UE 330 receives an assignment of radio resources to be used for receiving a DL transmission from the base station 320.

In a third step 630, the UE 330 receives an ARI indicating one of the configured collections of UL resources to be used for transmitting control information associated with the DL transmission. The ARI or the configured collection of UL resource may optionally define an explicit time position of the UL resources; alternatively, the time position of the UL resources is relative to the time position of the DL resources to be used for the DL transmission, such as being located a predefined number of slots later in time.

In a fourth step 640, the UE 330 uses at least a subset of the indicated collection of UL resources to transmit the control information associated with the DL transmission to the base station 320. More precisely, the indicated collection of UL resources comprises a plurality of selectable UL resource sets, from which the UE 330 transmits an UL resource set corresponding to an operational state of the communication network.

Therefore, even if two operational modes differ in terms of their requirements for UL resources for control information, there is no need to introduce separate ARI values for the two operational modes. Instead, the meaning of a signaled ARI value wilt depend on the operational mode of the communication network 300. If the UE 330 is aware of the current operational mode, this implies that an amount of signaling overhead can be left out. For instance, the UE 330 can become aware of the current operation mode by receiving semi-static or dynamic signaling that is separate from the ARI, or by ascertaining a value of an internal variable reflecting a previous configuration message, or by considering operational aspects of the network 300 that reveal the operational mode implicitly. Instead, the UE 330 may determine implicitly based on the operational mode what resources an ART value refers to. This said, even though a given ARI value may be reinterpreted as the operational mode changes, there is a need for two or more distinct ARI values if separate resources are to be allocated to two or more UEs contemporaneously.

The possible overhead reduction will be illustrated by a comparison between a reference implementation, where ARI values are unique across operational modes, and an implementation according to an example embodiment. In below Tables 1 and 2, ARI values are explicit, Rn (n=0, . . . , 16) represent resource indices, whereas M1 and M2 represent two operational modes of the communication system.

TABLE 1

Reference implementation

| ARI value | UL resources indicated in operational mode M1 | UL resources indicated in operational mode M2 | Used in operational modes |
|---|---|---|---|
| 000 | R0, R1, R2, R3 | R0, R1, R2, R3 | M1 |
| 001 | R4, R5, R6, R7 | R4, R5, R6, R7 | M1 |
| 010 | R8, R9, R10, R11 | R8, R9, R10, R11 | M1 |
| 011 | R12, R13, R14, R15 | R12, R13, R14, R15 | M1 |
| 100 | R0, R1 | R0, R1 | M2 |
| 101 | R4, R5 | R4, R5 | M2 |
| 110 | R8, R9 | R8, R9 | M2 |
| 111 | R12, R13 | R12, R13 | M2 |

Table 1 illustrates an implementation where the UE's interpretation of the ARI values is independent of the operational mode of the communication system 300. In practice, ARI values "000", "001", "010" and "011" are not expected in operational mode M2. Similarly, ARI values "100", "101", "110" and "111" normally would not be used in operational mode M1.

TABLE 2

Exampile configuration I

| ARI value | UL resources indicated in operational mode M1 | UL resources indicated in operational mode M2 | Used in operational modes |
|---|---|---|---|
| 00 | R0, R1, R2, R3 | R0, R1 | M1, M2 |
| 01 | R4, R5, R6, R7 | R4, R5 | M1, M2 |
| 10 | R8, R9, R10, R11 | R8, R9 | M1, M2 |
| 11 | R12, R13, R14, R15 | R12, R13 | M1, M2 |

Because a reduced set of control information values is defined for operational mode M2, each ARI value used in that operational mode indicates a smaller set of UL resources. Further UL resource sets {R0, R1, R2, R3} and {R0, R1} cannot be selected in the same operational mode, not even by different UEs. Accordingly, these UL resource sets may be addressed using a common ARI value, which is here fixed to "00", In the example, the example embodiment reduces the necessary ARI payload from three to two bits.

Phrased in another way, the signaled ARI value "00" has a basic meaning (e.g., {R0, R1, R2, R3}) which is overlaid with one or more further meanings (e.g., {R0, R1}) that apply when the communication system is in a particular operational mode or modes.

Figure 7:
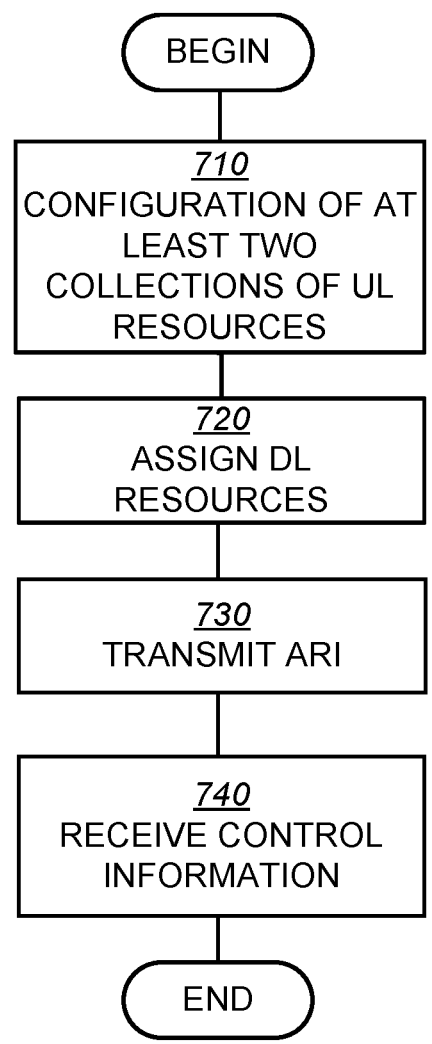
FIG. 7 is a flowchart illustrating a method implemented in a base station.

In accordance with an example embodiment, FIG. 7 illustrates a method implemented in the base station 320.

In a first step 710, the base station 320 obtains a configuration of at least two collections of UL resources to be used for receiving control information from user equipments in coverage of the communication network. Normally, the configuration is not addressed to a particular UE but to all UE operating in a portion of the network.

In a second step 720, the base station 320 assigns radio resources to be used for transmitting a DL transmission to a UE 330. In implementations, the configuration and the assignment may differ in scope insofar as the configuration applies for all UEs operating in coverage of (a portion of) the communication network, whereas a DL assignment is typically addressed to a particular one UE.

In a third step 730, the base station 320 transmits an ARI to the user equipment. The ARI may indicate one of the configured collections of UL resources to be used for receiving control information associated with the DL transmission. As noted for step 630 (FIG. 6), the UL resources have an implicit time position (such as a constant separation) or an explicit time position (such as a signaled slot or symbol index).

In a fourth step 740, the base station 320 uses at least a subset of the indicated collection of UL resources to receive the control information from the UE 330. In this example embodiment, the indicated collection of UL resources comprises a plurality of selectable UL resource sets and the control information is received on one of the UL resource sets which corresponds to an operational state of the communication network. As explained above with reference to FIG. 7, this has advantages at least from the point of view of limiting signaling overhead.

A number of further developments of the example embodiments illustrated by FIGS. 6 and 7 will now be discussed. It is emphasized that the features recited in the context of these further developments are also useful on their own and may be practiced autonomously, independently of the related basic embodiments.

The UE 330 may receive and attempt to decode the DL transmission control information, wherein the control information is determined based on the decoding success. Alternatively or additionally, the control information may comprise a request for UL transmission resources and/or a result of a measurement performed by the UE 330. In particular, the control information, which the UE 330 transmits and the base station 320 receives, may comprise acknowledgement information associated with the DL transmission, such as ARQ or HARQ feedback.

In an example embodiment, the selectable sets of UL resources in the indicated collection of UL resources differ with respect to their cardinality. In particular, two selectable sets of UL resources may comprise different numbers of UL resources. The number of UL resources available for the control information may influence the granularity of the information carried. For example, in an operational mode where each UL resource set comprises relatively fewer UL resources, HARQ feedback may be sent on the level of a transport block comprising plural codewords, whereas in an operational mode with relatively more UL resources per UL resource set, HARQ feedback may be provided on the level of each codeword making up the transport block. In the latter case, requested retransmissions may be limited to the codewords for which decoding has failed. This property may apply also for the selectable sets of UL resources in other collections of UL resources than the indicated collection.

In an example embodiment, the indicated collection of UL resources has a first UL resource set which comprises UL resources in addition to those of a second UL resource set. Alternatively or additionally, the second UL resource set in the indicated collection of UL resources may be a subset of the first UL resource set. In particular, the second UL resource set may be a proper subset of the first UL resource set. The UL resource sets illustrated in Table 2 have these properties. Here, the collections of UL resources correspond to the rows of the table, and UL resource sets within one collection correspond to different columns of a row. In the collection indicated by ARI value "10", a first UL resource set in the sense of this paragraph may be {R8, R9, R10, R11}, which corresponds to operational mode M1, and a second UL resource set may be {R8, R9}, which corresponds to operational mode M2.

In an example embodiment, the operational states represent acknowledgement feedback modes or HARQ feedback modes. An acknowledgement feedback mode may be a common setting of the communication network 300 and user equipments 330 in coverage thereof. An acknowledgement feedback mode may be associated with an agreement or common understanding between a user equipment 330 and a base station 320 as to what acknowledgement messages can be communicated. The agreement may be in the form of a table associating a signaled value (as represented by a code, a sequence, or an UL resource) with a meaning in the acknowledgement or HARQ context. Example meanings may be: a positively or negatively valued acknowledgement (ACK or NACK) and/or a restriction of the acknowledgement to a specific portion of the DL transmission and/or further information, such as a scheduling request. Two acknowledgement modes may differ with respect to the size of such a table or, expressed more generally, with respect to the granularity of the acknowledgement signaling. An acknowledgement feedback mode with relatively more granular (e.g., relatively coarser) signaling—hence, fewer available meanings—may be referred to as a compressed acknowledgement feedback mode. With reference to the first and second UL resource sets discussed and exemplified in the preceding paragraph, the second UL resource set (which has smaller cardinality) may be employed in the compressed acknowledgement feedback mode, whereas the first UL resource set (which has greater cardinality) may be employed in a non-compressed mode, referred to as a normal acknowledgement feedback mode.

In this context, whether the normal or the compressed acknowledgement feedback mode is currently applicable may be or have been explicitly signaled or may be derivable from other parameters accessible to the UE 330 and base station 320. The responsibility for initiating a transition between acknowledgement feedback modes may lie with the UE 330, the base station 320 or another node of the communication network 300.

Further, the communication network 300 may be operable in more than two acknowledgement feedback modes. At least some of the modes may differ with respect to the cardinality or size of the corresponding UL resource sets in the collection of UL resources. The acknowledgement feedback modes may be ordered sequentially, so that a transition may be signaled incrementally, e.g., by a step 'up' or 'down' in relation to the current mode.

In an example embodiment, the collections of UL resources are configured in such manner that each collection comprises at least two selectable UL resource sets. The selectable UL resource sets may correspond to respective operational modes. Such a configuration is illustrated in Table 2 above. Configuring the collections of UL resources in this manner may have the advantageous effect that a transition between the operational modes is possible regardless of the collection indicated by the ARI. Put differently, the entity responsible for initiating a transition between operational modes need not consider whether a collection of UL resources is being indicated by ARI or may be expected to be indicated by ARI in the near future.

In an example embodiment, the configuration of the collection of UL resources reaches the UE 330 by semi-static signaling, such as Radio Resource Control (RRC) signaling. If the base station 320 is responsible for configuring the collection of UL resources, it may signal the configuration semi-statically to the UE 330. If instead a different entity of the communication network 300 is responsible for configuring the collection of UL resources, then both the UE 330 and the base station 320 may receive semi-static signaling indicative of the configuration.

In an example embodiment, the ARI is transmitted in a message comprising additional information. In particular, the ARI may be transmitted in a message also containing the DL assignment. The message may be a DCI message. The DCI message may be transmitted from the base station 320 to the UE 330 on a physical DL control channel.

In an example embodiment, the method illustrated in FIG. 6 further comprises the UE 330 determining an operational mode of the communication network 330. Based on the operational mode that currently applies (or which will apply or is expected to apply when the assigned DL transmission is to be received by the UE 330), the UE 330 selects a UL resource set to be used for transmitting the control information to the communication network 300.

In an example embodiment, the fact that the UL resource sets corresponding to different operational modes differ with respect to their cardinality or size is utilized by the base station 320. For example, in an operational mode corresponding to relatively smaller UL resources sets, a larger number of UEs can be allowed to transmit control information. As a consequence, more UEs can be scheduled simultaneously. As illustrated by Table 2, UL resources R2, R3, R6, R7, R10, R11, R14 and R15 are not used in operational mode M2. If a three-bit ARI representation is used, one may configure the collections of UL resources in the way illustrated by Table 3.

TABLE 3

Example configuration II

| ARI value | UL resources indicated in operational mode M1 | UL resources indicated in operational mode M2 | Used in operational modes |
|---|---|---|---|
| 000 | R0, R1, R2, R3 | R0, R1 | M1, M2 |
| 001 | R4, R5, R6, R7 | R4, R5 | M1, M2 |
| 010 | R8, R9, R10, R11 | R8, R9 | M1, M2 |
| 011 | R12, R13, R14, R15 | R12, R13 | M1, M2 |
| 100 | R0, R1, R2, R3 | R2, R3 | M1, M2 |
| 101 | R4, R5, R6, R7 | R6, R7 | M1, M2 |
| 110 | R8, R9, R10, R11 | R10, R11 | M1, M2 |
| 111 | R12, R13, R14, R15 | R14, R15 | M1, M2 |

In operational mode M1, the UL resources corresponding to ARI values "000" and "100" are overlap—actually coincide—but in operational mode M2 they are disjoint. The same is true, in the respective operational modes, for the UL resources corresponding to ARI values "001" and "101"; ARI values "010" and "110"; and ARI values "011" and "111". Accordingly, while this configuration allows four simultaneous UEs to transmit control information in operational mode M1, eight UEs may transmit simultaneously in operational mode M2.

The base station 320 may utilize this for the benefit of network performance by assigning respective radio resources to be used for transmitting DL transmissions to a UE 291 and a further UE 292. The base station 320 then transmits an ARI to the further user equipment 292 indicating a different one of the configured collections of UL resources to be used for receiving control information associated with the DL transmission to the further user equipment. The base station 320 does this in such manner that, in the indicated collection of UL resources, the respective UL resource sets corresponding to a current operational state of the communication network are disjoint. This represents a performance gain if resource sets corresponding to at least one non-current operational state of the communication network are overlapping.

The wireless connection 370 between the UE 330 and the base station 320 is in accordance with the teachings of the embodiments described throughout this disclosure and FIGS. 6 and 7 in particular. One or more of the various embodiments improve the performance of OTT services provided to the UE 330 using the OTT connection 350, in which the wireless connection 370 forms the last segment. More precisely, the teachings of these embodiments may improve the spectrum efficiency and peak capacity of the network 300 by reducing the signaling overhead. This may provide benefits such as larger data capacity, lower risk of network congestion and/or extended battery lifetime.

A measurement procedure may be provided for the purpose of monitoring data rate, latency and other factors on which the one or more embodiments improve. There may further be an optional network functionality for reconfiguring the OTT connection 350 between the host computer 310 and UE 330, in response to variations in the measurement results. The measurement procedure and/or the network functionality for reconfiguring the OTT connection 350 may be implemented in the software 311 of the host computer 310 or in the software 331 of the UE 330, or both. In embodiments, sensors (not shown) may be deployed in or in association with communication devices through which the OTT connection 350 passes; the sensors may participate in the measurement procedure by supplying values of the monitored quantities exemplified above, or supplying values of other physical quantities from which software 311, 331 may compute or estimate the monitored quantities. The reconfiguring of the OTT connection 350 may include message format, retransmission settings, preferred routing etc.; the reconfiguring need not affect the base station 320, and it may be unknown or imperceptible to the base station 320. Such procedures and functionalities may be known and practiced in the art. In certain embodiments, measurements may involve proprietary UE signaling facilitating the host computer's 310 measurements of throughput, propagation times, latency and the like. The measurements may be implemented in that the software 311, 331 causes messages to be transmitted, in particular empty or 'dummy' messages, using the OTT connection 350 while it monitors propagation times, errors etc.

FIG. 4 is a flowchart illustrating a method implemented in a communication system, in accordance with one embodiment. The communication system includes a host computer, a base station and a UE which may be those described with reference to FIGS. 2 and 3. For simplicity of the present disclosure, only drawing references to FIG. 4 will be included in this section. In a first step 410 of the method, the host computer provides user data. In an optional substep 411 of the first step 410, the host computer provides the user data by executing a host application. In a second step 420, the host computer initiates a transmission carrying the user data to the UE. In an optional third step 430, the base station transmits to the UE the user data which was carried in the transmission that the host computer initiated, in accordance with the method illustrated in FIG. 7. In an optional fourth step 440, the UE executes a client application associated with the host application executed by the host computer.

FIG. 5 is a flowchart illustrating a method implemented in a communication system, in accordance with one embodiment. The communication system includes a host computer, a base station and a UE which may be those described with reference to FIGS. 2 and 3. For simplicity of the present disclosure, only drawing references to FIG. 5 will be included in this section. In a first step 510 of the method, the host computer provides user data. In an optional substep (not shown) the host computer provides the user data by executing a host application. In a second step 520, the host computer initiates a transmission carrying the user data to the UE. The transmission may pass via the base station, in accordance with the method illustrated in FIG. 7. In an optional third step 530, the UE receives the user data carried in the transmission, in accordance with the method illustrated in FIG. 6.

Further Example Embodiments

1. A method of transmitting control information to a communication network (300), the method being implemented in a user equipment (330) and comprising:
being configured with at least two collections of uplink, UL, resources to be used for transmitting control information to the communication network;
receiving an assignment of radio resources to be used for receiving a downlink, DL, transmission from a base station (320) of the communication network;
receiving an acknowledgement resource indication, ARI, indicating one of the configured collections of UL resources to be used for transmitting control information associated with the DL transmission; and
transmitting the control information to the base station on at least a subset of the indicated collection of UL resources,
wherein the indicated collection of UL resources comprises a plurality of selectable UL resource sets and the control information is transmitted on one of the UL resource sets which corresponds to an operational state of the communication network.

2. The method of embodiment 1, wherein the control information comprises acknowledgement information associated with the DL transmission.

3. The method of embodiment 1 or 2, wherein, in the indicated collection of UL resources, at least two of the selectable UL resource sets differ with respect to their cardinality.

4. The method of any of the preceding embodiments, wherein, in the indicated collection of UL resources, a first UL resource set comprises UL resources in addition to those of a second UL resource set.

5. The method of any of the preceding embodiments, wherein, in the indicated collection of UL resources, a second UL resource set is a subset of a first UL resource set.

6. The method of embodiment 4 or 5, wherein:
the operational states represent acknowledgement feedback modes;
the first UL resource set corresponds to a regular acknowledgement feedback mode; and
the second UL resource set corresponds to a compressed acknowledgement feedback mode.

7. The method of any of the preceding embodiments, wherein each configured collection of UL resources comprises two or more selectable UL resource sets.

8. The method of any of the preceding embodiments, wherein, in the UL resource set on which the control information is transmitted, each UL resource represents a positively or negatively valued acknowledgement, optionally combined with a restriction to a specific portion of the DL transmission and/or further information.

9. The method of embodiment 8, wherein the UL resources are distinguishable by at least one of: time, frequency, code.

10. The method of any of the preceding embodiments, wherein the user equipment is configured with the collections of UL resources by semi-static signaling.

11. The method of any of the preceding embodiments, further comprising:
determining the operational mode of the communication network and selecting, based thereon, the UL resource set to be used for transmitting the control information to the communication network.

12. The method of any of the preceding embodiments, wherein the ARI is received in a message comprising additional information.

13. The method of embodiment 12, wherein said message comprises the ARI and the assignment.

14. A user equipment (330) comprising a radio interface (337) and processing circuitry (338) configured to:
allow the UE to be configured with at least two collections of uplink, UL, resources to be used for transmitting control information to the communication network;
receive an assignment of radio resources to be used for receiving a downlink, DL, transmission from a base station (320) of the communication network;
receive an acknowledgement resource indication, ARI, indicating one of the configured collections of UL resources to be used for transmitting control information associated with the DL transmission; and
transmit the control information to the base station on at least a subset of the indicated collection of UL resources,
wherein the indicated collection of UL resources comprises a plurality of selectable UL resource sets and the control information is transmitted on one of the UL resource sets which corresponds to an operational state of the communication network.

15. The user equipment of embodiment 14, wherein the processing circuitry is further configured to perform the method of any of embodiments 2 to 13.

16. A method of receiving control information at a base station (212; 320) of a communication network (211; 330), the method comprising:
obtaining a configuration of at least two collections of uplink, UL, resources to be used for receiving control information from user equipments in coverage of the communication network;
assigning radio resources to be used for transmitting a downlink, DL, transmission to a user equipment (291; 330);
transmitting an acknowledgement resource indication, ARI, to the user equipment, the ARI indicating one of the configured collections of UL resources to be used for receiving control information associated with the DL transmission; and
receiving the control information from the user equipment on at least a subset of the indicated collection of UL resources,
wherein the indicated collection of UL resources comprises a plurality of selectable UL resource sets and the control information is received on one of the UL resource sets which corresponds to an operational state of the communication network.

17. The method of embodiment 16, wherein the obtaining of a configuration of the collections of UL resources comprises determining the configuration.

18. The method of embodiment 17, wherein the obtaining of a configuration of the collections of UL resources further comprises transmitting semi-static signaling to the user equipment.

19. The method of embodiment 16, wherein the obtaining of a configuration of the collections of UL resources comprises receiving information from a different node of the communication network.

20. The method of any of embodiments 16 to 19, further comprising:
assigning radio resources to be used for transmitting a DL transmission to a further user equipment (292); and
transmitting an ARI to the further user equipment, the ARI indicating a different one of the configured collections of UL resources to be used for receiving control information associated with the DL transmission to the further user equipment,
wherein, in the indicated collection of UL resources, the respective UL resource sets corresponding to a current operational state of the communication network are disjoint.

21. The method of embodiment 20, wherein, in the indicated collections of UL resources, respective UL resource sets corresponding to at least one non-current operational state of the communication network are overlapping.

22. The method of any of embodiments 16 to 21, wherein the control information comprises acknowledgement information associated with the DL transmission.

23. The method of any of embodiments 16 to 22, wherein, in the indicated collection of UL resources, at least two of the selectable UL resource sets differ with respect to their cardinality.

24. The method of any of embodiments 16 to 23, wherein, in the indicated collection of UL resources, a first UL resource set comprises UL resources in addition to those of a second UL resource set.

25. The method of any of embodiments 16 to 24, wherein, in the indicated collection of UL resources, a second UL resource set is a subset of a first UL resource set.

26. The method of embodiment 24 or 25, wherein:
the operational states represent acknowledgement feedback modes;
the first UL resource set corresponds to a regular acknowledgement feedback mode; and
the second UL resource set corresponds to a compressed acknowledgement feedback mode.

27. The method of any of embodiments 16 to 26, wherein each configured collection of UL resources comprises two or more selectable UL resource sets.

28. The method of any of embodiments 16 to 27, wherein, in the UL resource set on which the control information is transmitted, each UL resource represents a positively or negatively valued acknowledgement, optionally combined with a restriction to a specific portion of the DL transmission and/or further information.

29. The method of embodiment 28, wherein the UL resources are distinguishable by at least one of: time, frequency, code.

30. The method of any of embodiments 16 to 29, further comprising:
   determining the operational state of the communication network and selecting, based thereon, the UL resource set to be used for receiving the control information.

31. The method of any of embodiments 16 to 30, wherein the ARI is transmitted in a message comprising additional information.

32. The method of embodiment 31, wherein said message comprises the ARI and the assignment.

33. A base station (320) for operating in a communication network (300) comprising a radio interface (327) and processing circuitry (328) configured to:
   obtain a configuration of at least two collections of uplink, UL, resources to be used for receiving control information from user equipments in coverage of the communication network;
   assign radio resources to be used for transmitting a downlink, DL, transmission to a user equipment (330);
   transmit an acknowledgement resource indication, ARI, to the user equipment, the ARI indicating one of the configured collections of UL resources to be used for receiving control information associated with the DL transmission; and
   receive the control information from the user equipment on at least a subset of the indicated collection of UL resources,
   wherein the indicated collection of UL resources comprises a plurality of selectable UL resource sets and the control information is received on one of the UL resource sets which corresponds to an operational state of the communication network.

34. The base station of embodiment 33, wherein the processing circuitry is further configured to perform an of the methods of embodiments 17 to 32.

35. A computer program comprising computer-readable instructions for causing a programmable processor to perform the method of any of embodiments 1 to 13 or any of embodiments 16 to 32.

36. A computer program product comprising a computer-readable medium storing the computer program of embodiment 35.

Embodiments herein also include a computer program comprising instructions which, when executed by at least one processor of a UE or a base station, cause the UE or base station to carry out the methods shown in FIGS. 4 to 7, or variations thereof. In one or more embodiments, a computer-readable medium storing the computer program is embodied as communication media (or transitory media, such as an electronic signal, optical signal, radio signal) or storage media (or non-transitory media) or a combination thereof. The term storage media includes both volatile and nonvolatile, removable and non-removable media implemented in any method or technology for storage of information; storage media includes but is not limited to RAM, ROM, EEPROM, flash memory or other memory technology, CD-ROM, digital versatile disks or other optical disk storage, magnetic cassettes, magnetic tape, magnetic disk storage or other magnetic storage devices, or any other medium which stores the desired information and is accessible by a computer. In at least one embodiment, a communication node or other apparatus is configured to perform the operations or functions disclosed herein, based at least in part on node processing circuitry executing computer program instructions stored in a non-transitory computer-readable medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of transmitting control information to a communication network, the method being implemented in a user equipment (UE), the method comprising:
   receiving, via radio resource control signaling, a configuration of at least two collections of uplink (UL) resources to be used for transmitting control information to the communication network;
   receiving an assignment of radio resources to be used for receiving a downlink (DL) transmission from a base station of the communication network;
   receiving an acknowledgement resource indication (ARI) indicating one of the configured collections of UL resources to be used for transmitting control information associated with the DL transmission; and
   transmitting the control information associated with the DL transmission to the base station on at least a subset of the indicated collection of UL resources, wherein the control information associated with the DL transmission comprises acknowledgement information associated with the DL transmission, wherein the acknowledgement information is hybrid automatic repeat request (HARQ) feedback,
   wherein the indicated collection of UL resources comprises a plurality of selectable UL resource sets, the plurality of selectable UL resource sets including a first UL resource set for use in a first acknowledgement feedback mode of the communication network and a second UL resource set for use in a second acknowledgement feedback mode of the communication network, and wherein the control information associated with the DL transmission is transmitted on the one of the selectable UL resource sets which corresponds to the current acknowledgement feedback mode of the communication network,
   wherein, in the indicated collection of UL resources, the second UL resource set comprises the UL resources of the first UL resource set and UL resources in addition to those of the first UL resource set.

2. The method of claim 1, further comprising:
   determining the acknowledgement feedback mode of the communication network and selecting, based thereon, the UL resource set to be used for transmitting the control information associated with the DL transmission.

3. The method of claim 1, wherein the ARI is received in a downlink control information (DCI) message which also comprises the assignment.

4. A user equipment (UE) comprising a radio interface and processing circuitry configured to cause the UE to:
   receive, via radio resource control signaling, a configuration of at least two collections of uplink (UL) resources to be used for transmitting control information to a communication network;

receive an assignment of radio resources to be used for receiving a downlink (DL) transmission from a base station of the communication network;

receive an acknowledgement resource indication (ARI) indicating one of the configured collections of UL resources to be used for transmitting control information associated with the DL transmission; and transmit the control information associated with the DL transmission to the base station on at least a subset of the indicated collection of UL resources, wherein the control information associated with the DL transmission comprises acknowledgement information associated with the DL transmission, wherein the acknowledgement information is hybrid automatic repeat request (HARQ) feedback, wherein the indicated collection of UL resources comprises a plurality of selectable UL resource sets, the plurality of selectable UL resource sets including a first UL resource set for use in a first acknowledgement feedback mode of the communication network and a second UL resource set for use in a second acknowledgement feedback mode of the communication network, and wherein the control information associated with the DL transmission is transmitted on the one of the selectable UL resource sets which corresponds to the current acknowledgement feedback mode of the communication network, wherein, in the indicated collection of UL resources, the second UL resource set comprises the UL resources of the first UL resource set and UL resources in addition to those of the first UL resource set.

5. The UE of claim 4, wherein the processing circuitry is configured to cause the UE to:

determine the acknowledgement feedback mode of the communication network and select, based thereon, the UL resource set to be used for transmitting the control information associated with the DL transmission.

6. The UE of claim 4, wherein the processing circuitry is configured to cause the UE to receive the ARI in a downlink control information (DCI) message which also comprises the assignment.

7. A method of receiving control information at a base station of a communication network, the method comprising:

obtaining a configuration of at least two collections of uplink (UL) resources to be used for receiving control information from user equipments in coverage of the communication network;

signaling the configuration to a user equipment (UE), via radio resource control signaling;

assigning radio resources to be used for transmitting a downlink (DL) transmission to the UE;

transmitting an acknowledgement resource indication (ARI) to the UE, the ARI indicating one of the configured collections of UL resources to be used for receiving control information associated with the DL transmission; and receiving the control information associated with the DL transmission from the UE on at least a subset of the indicated collection of UL resources, wherein the control information associated with the DL transmission comprises acknowledgement information associated with the DL transmission, wherein the acknowledgement information is hybrid automatic repeat request (HARQ) feedback, wherein the indicated collection of UL resources comprises a plurality of selectable UL resource sets, the plurality of selectable UL resource sets including a first UL resource set for use in a first acknowledgement feedback mode of the communication network and a second UL resource set for use in a second acknowledgement feedback mode of the communication network, and wherein the control information associated with the DL transmission is received on the one of the selectable UL resource sets which corresponds to the current acknowledgement feedback mode of the communication network, wherein, in the indicated collection of UL resources, the second UL resource set comprises the UL resources of the first UL resource set and UL resources in addition to those of the first UL resource set.

8. The method of claim 7, wherein the obtaining of the configuration of the collections of UL resources comprises determining the configuration.

9. The method of claim 7, further comprising:

determining the acknowledgement feedback mode of the communication network and selecting, based thereon, the UL resource set to be used for receiving the control information associated with the DL transmission.

10. The method of claim 7, wherein the ARI is transmitted in a downlink control information (DCI) message which also comprises the assignment of radio resources to be used for transmitting the DL transmission to the UE.

11. A base station for operating in a communication network, the base station comprising a radio interface and processing circuitry configured to cause the base station to:

obtain a configuration of at least two collections of uplink (UL) resources to be used for receiving control information from user equipments in coverage of the communication network;

signal the configuration to a user equipment (UE), via radio resource control signaling;

assign radio resources to be used for transmitting a downlink (DL) transmission to the UE;

transmit an acknowledgement resource indication (ARI), to the UE, the ARI indicating one of the configured collections of UL resources to be used for receiving control information associated with the DL transmission; and receive the control information associated with the DL transmission from the UE on at least a subset of the indicated collection of UL resources, wherein the control information associated with the DL transmission comprises acknowledgement information associated with the DL transmission, wherein the acknowledgement information is hybrid automatic repeat request (HARQ) feedback, wherein the indicated collection of UL resources comprises a plurality of selectable UL resource sets, the plurality of selectable UL resource sets including a first UL resource set for use in a first acknowledgement feedback mode of the communication network and a second UL resource set for use in a second acknowledgement feedback mode of the communication network, and wherein the control information associated with the DL transmission is received on the one of the selectable UL resource sets which corresponds to the current acknowledgement feedback mode of the communication network, wherein, in the indicated collection of UL resources, the second UL resource set comprises the UL resources of the first UL resource set and UL resources in addition to those of the first UL resource set.

12. The base station of claim 11, wherein the base station is configured to obtain the configuration of the collections of UL resources by determining the configuration.

13. The base station of claim 11, wherein the processing circuitry is configured to cause the UE to:
   determine the acknowledgement feedback mode of the communication network and select, based thereon, the UL resource set to be used for receiving the control information associated with the DL transmission.

14. The base station of claim 11, wherein the processing circuitry is configured to cause the base station to transmit the ARI in a downlink control information (DCI) message which also comprises the assignment of radio resources to be used for transmitting the DL transmission to the UE.

* * * * *

UNITED STATES PATENT AND TRADEMARK OFFICE
CERTIFICATE OF CORRECTION

| | |
|---|---|
| PATENT NO. | : 11,711,173 B2 |
| APPLICATION NO. | : 17/847337 |
| DATED | : July 25, 2023 |
| INVENTOR(S) | : Parkvall et al. |

It is certified that error appears in the above-identified patent and that said Letters Patent is hereby corrected as shown below:

In the Specification

In Column 8, Line 21, delete "ART" and insert -- ARI --, therefor.

In Column 8, Line 31, delete "needed," and insert -- needed. --, therefor.

In Column 8, Line 38, delete "transmitting," and insert -- transmitting --, therefor.

In Column 8, Line 42, delete "UL, resources" and insert -- UL resources --, therefor.

In Column 8, Line 44, delete "ART," and insert -- ARI, --, therefor.

In Column 9, Line 3, delete "wilt" and insert -- will --, therefor.

In Column 9, Line 14, delete "ART" and insert -- ARI --, therefor.

In Column 9, Line 51, delete "Exampile" and insert -- Example --, therefor.

In Column 10, Line 1, delete ""00"," and insert -- "00". --, therefor.

Signed and Sealed this
Twenty-third Day of January, 2024

Katherine Kelly Vidal
*Director of the United States Patent and Trademark Office*